United States Patent
Dinnan et al.

(10) Patent No.: US 7,148,641 B2
(45) Date of Patent: Dec. 12, 2006

(54) DIRECT CURRENT AND ALTERNATING CURRENT MOTOR AND GENERATOR UTILIZING A PERIODIC TRANSFORMATION SYSTEM

(75) Inventors: James A. Dinnan, Athens, GA (US); Patrick Hernandez, Sacramento, CA (US); Joseph A. Dinnan, Cameron Park, CA (US)

(73) Assignee: Meta-C Corporation, Athens, GA (US)

( * ) Notice: Subject to any disclaimer, the term of this patent is extended or adjusted under 35 U.S.C. 154(b) by 0 days.

(21) Appl. No.: 10/959,457

(22) Filed: Oct. 5, 2004

(65) Prior Publication Data
US 2006/0071626 A1  Apr. 6, 2006

(51) Int. Cl.
*H02K 23/16* (2006.01)

(52) U.S. Cl. .................. 318/437; 318/700; 318/727; 318/804; 318/567; 388/904

(58) Field of Classification Search ........ 318/437, 318/700, 727, 804, 567, 438; 388/904, 825, 388/828, 829, 833, 838; 455/296
See application file for complete search history.

(56) References Cited

U.S. PATENT DOCUMENTS

| | | | |
|---|---|---|---|
| 4,860,624 A | 8/1989 | Dinnan | |
| 4,914,559 A | 4/1990 | Deisch | |
| 5,994,869 A | 11/1999 | Becerra | |
| 6,003,000 A | 12/1999 | Ozzimo | |
| 6,107,707 A | 8/2000 | Dwyer | |
| 6,144,181 A | 11/2000 | Rehm et al. | |
| 6,178,316 B1 * | 1/2001 | Dinnan et al. | ............... 455/296 |
| 6,297,980 B1 | 10/2001 | Smedley et al. | |
| 6,366,483 B1 | 4/2002 | Ma et al. | |
| 6,567,281 B1 | 5/2003 | Riggio | |
| 6,670,783 B1 | 12/2003 | Wachner | |
| 6,674,205 B1 | 1/2004 | Biais et al. | |

FOREIGN PATENT DOCUMENTS

| | | |
|---|---|---|
| CN | 2231454 Y | 7/1996 |
| CN | 2251739 Y | 4/1997 |
| CN | 2262770 Y | 9/1997 |
| CN | 2374879 Y | 4/2000 |
| CN | 1292598 A | 4/2001 |
| CN | 2466695 Y | 12/2001 |
| CN | 1391240 A | 1/2003 |
| CN | 1444321 A | 9/2003 |

OTHER PUBLICATIONS

Angrist, S.W.: "Perpetual Motion Machines," *Scientific American*, Scientific American Inc., New York, NY, vol. 218, No. 1, Jan. 1968, pp. 114-122.

* cited by examiner

*Primary Examiner*—Karen Masih
(74) *Attorney, Agent, or Firm*—Kenyon & Kenyon LLP

(57) ABSTRACT

In an AC or DC motor operation and power generation system, a periodic transformation system reduces or prevents harmonic distortion, reduces resistance or impedance, and improves energy efficiency in a signal either consumed, such as in a motor, or produced, such as in a generator. In one embodiment, the TruScale Reactance Transformation System or the Eastern Modified TruScale Octave Transformation System are the periodic transform systems provided to prevent overtone collisions in current and voltage signals, in order to maximize energy spectral density, and to precondition either DC or AC signals.

37 Claims, 6 Drawing Sheets

3 phase power source

DIRECT CURRENT AND ALTERNATING CURRENT MOTOR AND GENERATOR UTILIZING A PERIODIC TRANSFORMATION SYSTEM

FIELD OF THE INVENTION

The present invention relates to improvements in direct current (DC) and alternating current (AC) motors and generators. More specifically, the invention relates to the treatment of electrical resonance in DC and AC motors and generators. Even more specifically, the invention relates to the use of a periodic transformation system known as TruScale to reduce collisions in voltage signals.

BACKGROUND OF THE INVENTION

There have been various attempts over the years to apply signal processing techniques to improve performance of DC and AC motors and generators. Among other things, such efforts have been directed toward the improvement of power factor, one definition of which is the ratio of real power to apparent power. U.S. Pat. Nos. 6,670,783 and 6,674,205 provide examples of power factor improvements. Other approaches to the use of signal processing to improve power factor include U.S. Pat. No. 5,994,869.

One important aspect of power factor is the amount of impedance which an AC system has, or resistance that a DC system has. One cause of impedance or resistance is phase cancellation, which can occur when two or more complex waveform components collide with each other. Such collisions can result from different phase values which are present at the same time. Such collisions result in destructive interference which manifests itself as impedance and/or resistance within a waveform.

The inventors have conducted tests to determine the nature of phase cancellation, and have identified data pointing toward a consistent relationship found in phase cancellation. When the various internal components work against each other at a constant rate within a given time interval, it will be seen that the phase cancellation relationships will be relatively consistent. It would be desirable to employ signal processing techniques to use this phase cancellation relationship information to eliminate destructive interference, thereby reducing impedance and improving power factor.

Electrical resonance in both series and parallel form are known. The use of resonance in power systems has been limited, primarily because resonance has been viewed as producing negative and undesirable effects on power systems and appliances. U.S. Pat. Nos. 6,144,181 and 6,107,707 provide examples of techniques for reducing or eliminating resonance in electrical systems.

The techniques described in these patents are possible, in part, because resonant states of motors and generators can be determined through any number of means, including audio, video, tactile, electrical, or mechanical. Such calculations and determinations are well within the ability of ordinarily skilled artisans, and need not be detailed here.

According to investigations that the inventors have undertaken, while it appears that attempts have been made to use resonance characteristics advantageously in areas such as radio modulation and audio, in power systems precisely the opposite approach has been taken, as witnessed by the numerous attempts to reduce or eliminate resonance. From what the inventors have been able to determine, the transient nature of resonance has led to the perception that resonance is undesirable in power generation and transmission systems. Resonance has led to power spikes, which can be damaging to electrical equipment.

Because there are efficiencies to be obtained from the power levels resulting from resonance, it would be desirable to determine how to make resonance a persistent, rather than a transient phenomenon.

SUMMARY OF THE INVENTION

In view of the foregoing, it is one object of the present invention to generate phase cancellation data to eliminate destructive interference, and thereby improve power factor in motor and generator systems. In one aspect, the present invention uses such phase cancellation data to redistribute component signal energy into constructive groupings, rather than destructive groupings.

In one aspect, the present invention addresses the problem of destructive interference and impedance by a novel use of resonance, which others have tried to eliminate, to augment efficiency in DC and AC motor and generator systems. The invention utilizes electrical resonance, in both series and parallel form, to improve energy utilization throughout motor and/or generator systems. Rather than treating electrical resonance as a transient phenomenon to be reduced or eliminated, the inventive approach seeks to extend the persistence of the resonance phenomenon. By calculating or determining the resonant state of the motor and/or generator system in any of a number of known ways as mentioned above, and building the power circuitry in order to utilize the effective average and peak power increase and decreased impedance and/or resistance associated with the resonant state, the present invention is able to utilize the resonant effect to reduce impedance and/or resistance with a given input signal and subsequent usage of the signal in DC or AC motor and/or generator systems.

In a more specific implementation, the present invention uses a periodic transformation system to reduce or prevent harmonic distortion, reduce resistance and/or impedance, and optimize energy efficiency in signals either that are consumed, such as in a motor, or produced, such as in a generator. In one embodiment, the invention uses a periodic transformation system such as the TruScale Reactance Transformation System, and in one further embodiment, the Eastern Modified TruScale Octave Transformation System, to prevent overtone collisions. Various aspects of the TruScale Octave Transformation System have been disclosed in commonly assigned patents, including U.S. Pat. Nos. 4,860,624 and 5,306,865, the disclosures of which are incorporated by reference here. Other commonly assigned patents disclose and teach other uses of TruScale in signal processing, including U.S. Pat. Nos. 6,003,000, 6,178,316, and 6,415,253, all of which also are incorporated by reference herein.

BRIEF DESCRIPTION OF THE DRAWINGS

The present invention now will be described in detail with respect to certain embodiments, and with reference to the accompanying drawings, in which.

DETAILED DESCRIPTION OF PREFERRED EMBODIMENTS

Figure 1A:
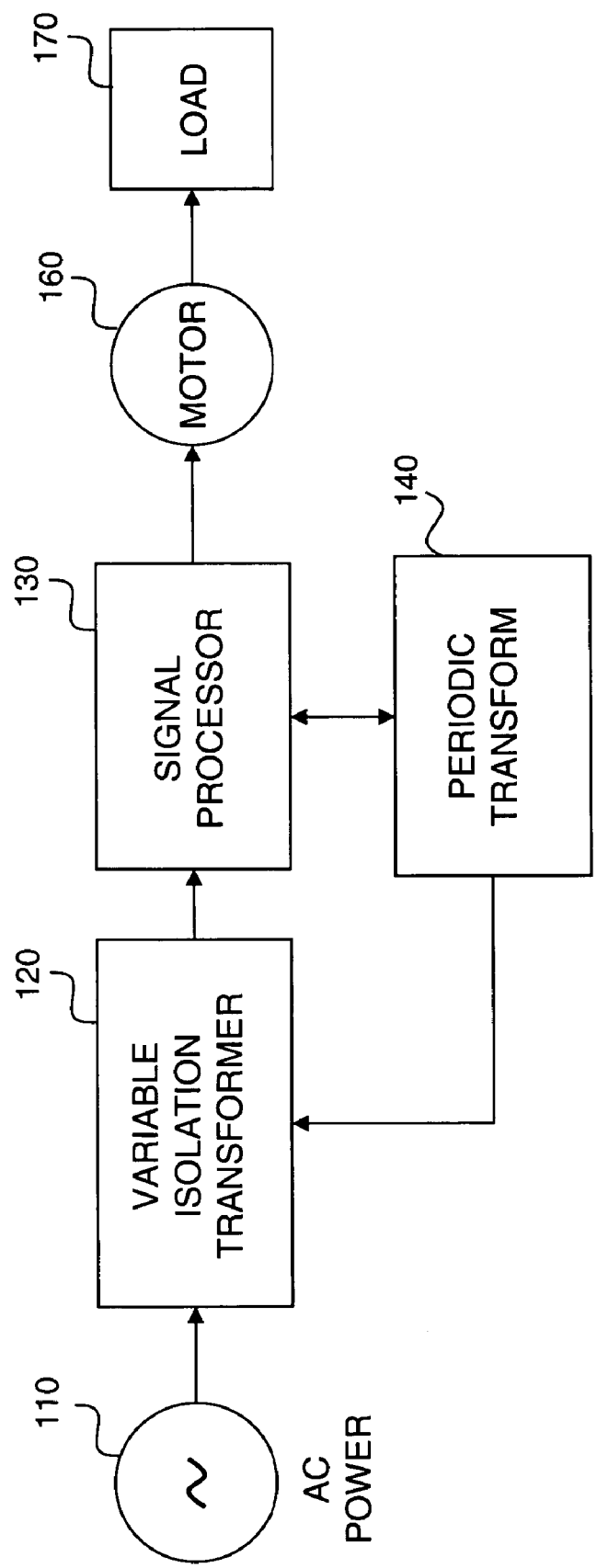
FIG. 1A is a block diagram of a system incorporating the signal processing techniques of the present invention.

In FIG. 1A, an AC power source 110, such as a wall outlet or, in larger scale configurations, power provided directly from a commercial or other power source, provides current to variable isolation transformer 120, the output of which passes through signal processor 130 to motor 160, which in turn powers a load 170. The intervening signal processor 130 employs signal processing techniques including application of a periodic transform in accordance with the invention. The periodic transform is shown as a separate block 140 in FIG. 1A, but could be included in signal processor 130 if desired. A line is shown from periodic transform block 140 back to variable isolation transformer 120, to show how, in one embodiment, current draw through the transformer may be reduced in accordance with the invention, while preserving desired power output. In addition, while signal processing block 130 and periodic transform 140 are shown separate from motor 160, motor 160 could include these blocks as part of an overall unit for powering a load.

In the course of their research, the inventors have analyzed a relationship between inductive reactance and capacitive reactance of a signal, and have noted an inverse relationship, which results from a phase difference which occurs between the voltage and the current of any signal. It is possible to depict on a unit circle a relationship between the degree of phase offset relative to zero phase (or complete coherence) and resistance and/or impedance in the signal. For each degree of phase inter-modulation offset, there is a corresponding increase in the resistance or impedance which is inherent in any signal. There is always a certain amount of inductance or capacitance, irrespective of whether explicit inductors or capacitors are used in a given circuit. Issues of inductive reactance and capacitive reactance are important, because the inventors have appreciated that the differences realized between apparent power and true power (and hence in power factor) using conventional methods of power production and utilization result from these differences in phase, caused by inaccurate calculation of and compensation for signal reactances.

The following table provides a set of inductive reactance and capacitive reactance values, and intervals which includes one embodiment of the Tru-Scale Octave Transformation System. It should be noted that this table reflects only a limited number of octaves in this embodiment of Tru-Scale. The table can be extrapolated upwardly and downwardly to yield additional values.

Truscale Reactance Transformation System

TABLE 1

| Capacitive Reactance | Interval | Inductive Reactance | Interval |
|---|---|---|---|
| 1.171875 | | 1.171875 | |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |

TABLE 1-continued

| Capacitive Reactance | Interval | Inductive Reactance | Interval |
|---|---|---|---|
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.0488281250 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 | | 2.34375 | |

A similar table is possible, using the following Modified Eastern Tru-Scale Octave Transformation System: Again, it should be noted that this table reflects only a limited number of octaves in this embodiment of Tru-Scale. The table can be extrapolated upwardly and downwardly to yield additional values.

| Interval | Capacitive Reactance Frequency | Ratios | Note | Inductive Reactance Frequency | Interval |
|---|---|---|---|---|---|
| 12 | 300 | 1:1 | C.sup.0 | 300 | 12.5 |
| 12 | 312 | 25:24 | C.music-sharp. | 312.5 | 12.5 |
| 12 | 324 | 13:12 | D.sup..music-flat. | 325 | 12.5 |
| 12 | 335 | 9:8 | D | 337.5 | 12.5 |
| 12 | 348 | 7:6 | D.music-sharp. | 350 | 12.5 |
| 12 | 360 | 29:24 | E.music-flat. | 362.5 | 12.5 |
| 12 | 372 | 5:4 | E | 375 | 12.5 |
| 12 | 384 | 31:24 | E.sup..music-sharp. | 387.5 | 12.5 |
| 12 | 396 | 4:3 | F.sup..music-flat. | 400 | 12.5 |
| 12 | 408 | 11:8 | F | 412.5 | 12.5 |
| 12 | 420 | 17:12 | F.sup..music-sharp. | 425 | 12.5 |
| 12 | 432 | 35:24 | G.sup..sup..music-flat. | 437.5 | 12.5 |
| 12 | 444 | 3:2 | G | 450 | 12.5 |
| 12 | 456 | 3:2 | G | 450 | 0 |
| 12 | 468 | 37:24 | G.sup..music-sharp. | 462.5 | 12.5 |
| 12 | 480 | 19:12 | H.sup..sup..music-flat. | 475 | 12.5 |
| 12 | 492 | 13:8 | H | 487.5 | 12.5 |
| 12 | 504 | 5:3 | H.sup..music-sharp. | 500 | 12.5 |
| 12 | 516 | 41:24 | A.sup..sup..music-flat. | 512.5 | 12.5 |
| 12 | 528 | 7:4 | A | 525 | 12.5 |
| 12 | 540 | 43:24 | A.sup..music-sharp. | 537.5 | 12.5 |
| 12 | 552 | 11:6 | B.sup..sup..music-flat. | 550 | 12.5 |
| 12 | 564 | 15:8 | B | 562.5 | 12.5 |
| 12 | 576 | 23:12 | B.sup..music-sharp. | 575 | 12.5 |
| 12 | 588 | 47:24 | C.sup..sup..music-flat. | 587.5 | 12.5 |
| 12 | 600 | 2:1 | C.sup.1 | 600 | |

Figure 1B:
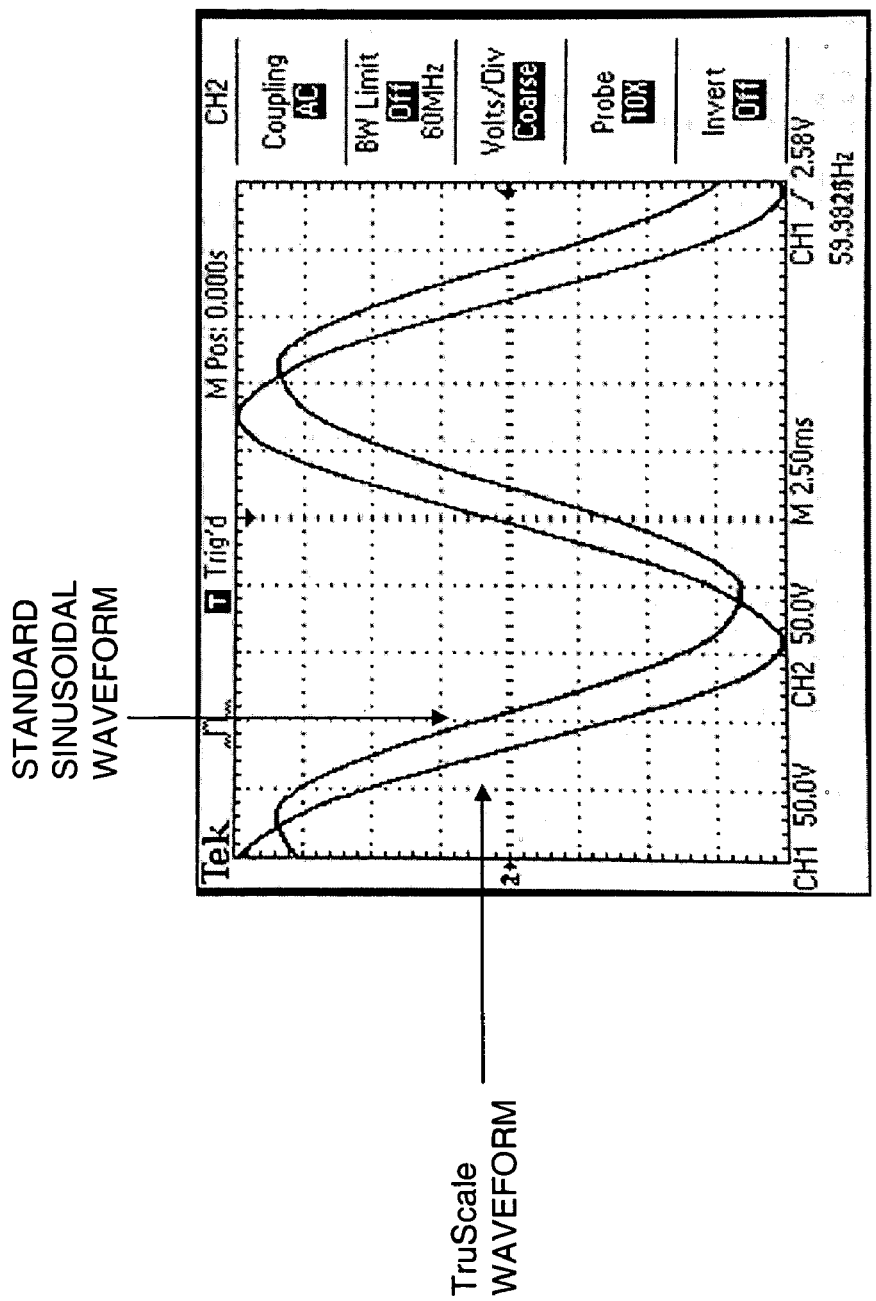
FIG. 1B is an oscilloscope capture of the present invention's waveform as compared to an unprocessed signal.

AC and DC motors operate using sinusoidal waveforms to induce a magnetic field which moves the rotor of a motor in order to perform work. Conventionally, the sinusoidal waveforms applied are symmetrical. The magnetic field strength is determined in part by the speed at which current rises in the motor. The faster that current rises in that signal, the more realized power may be available from the motor utilizing the signal. In accordance with the present invention, the upslope of the sinusoidal waveform is accelerated going from zero to maximum, and also (in a negative sense) from zero to minimum. FIG. 1B is an oscilloscope capture of the waveform that the present invention yields, as compared to an unprocessed signal. As shown, the present invention has greater amplitude and concurrent average power as compared to the unprocessed signal. In addition, the present invention's waveform, while non sinusoidal in nature, because of the use of a non averaging transform (such as TruScale in one embodiment), still can be consumed by devices such as motors that are currently using the average sinusoidal waveform model.

The inventors have conducted tests, including tests of the following two types. In a first type of test, the load is a water pump. The results of the invention are measured according to the increase in pumping rate for a given amount of voltage input, or in the same or roughly the same amount of work being performed for a decreased amount of voltage. The decrease in power input translates to reduced requirements off the power grid. In a second type of test, the load was a set of 1000 watt lamps in which a first amount of power was drawn from the grid to power the lamps, and then the invention was applied, still powering the lamps but with a greatly reduced power draw from the grid. As will be appreciated from these tests, the invention has applicability not only to the driving of electric motors (which in their broadest sense basically convert electrical energy to mechanical energy), but also to the operation of generators (which in their broadest sense basically convert mechanical energy to electrical energy). As used in motors, the invention reduces distortion in the input signals from the electrical source, be it a wall outlet or a larger power grid, to make the mechanical output of the motor more efficient. As used in generators, the invention reduces distortion in the output signals that provide electrical power, to make the power output more efficient, and enable the more efficient operation of electrical equipment.

Figure 2A:
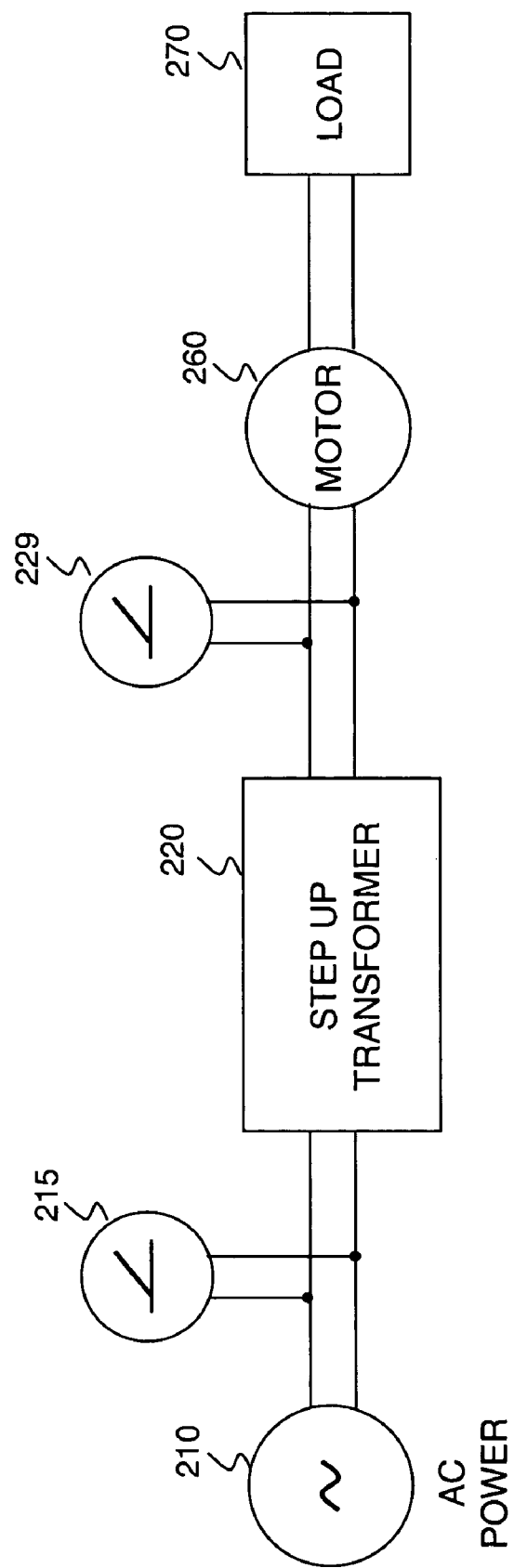
FIG. 2A is a block diagram of a baseline test configuration used to show the power efficiency improvements that the present invention achieves.

Looking now at FIG. 2A, showing a baseline test configuration, AC power source 210 is connected to step up transformer 220. A meter 215 measures current, voltage, and power characteristics coming out of the AC power source 210. The output of step up transformer 220 is provided to motor 260, and then to load 270. Meter 229 measures the output of the transformer going into the motor 260.

Figure 2B:
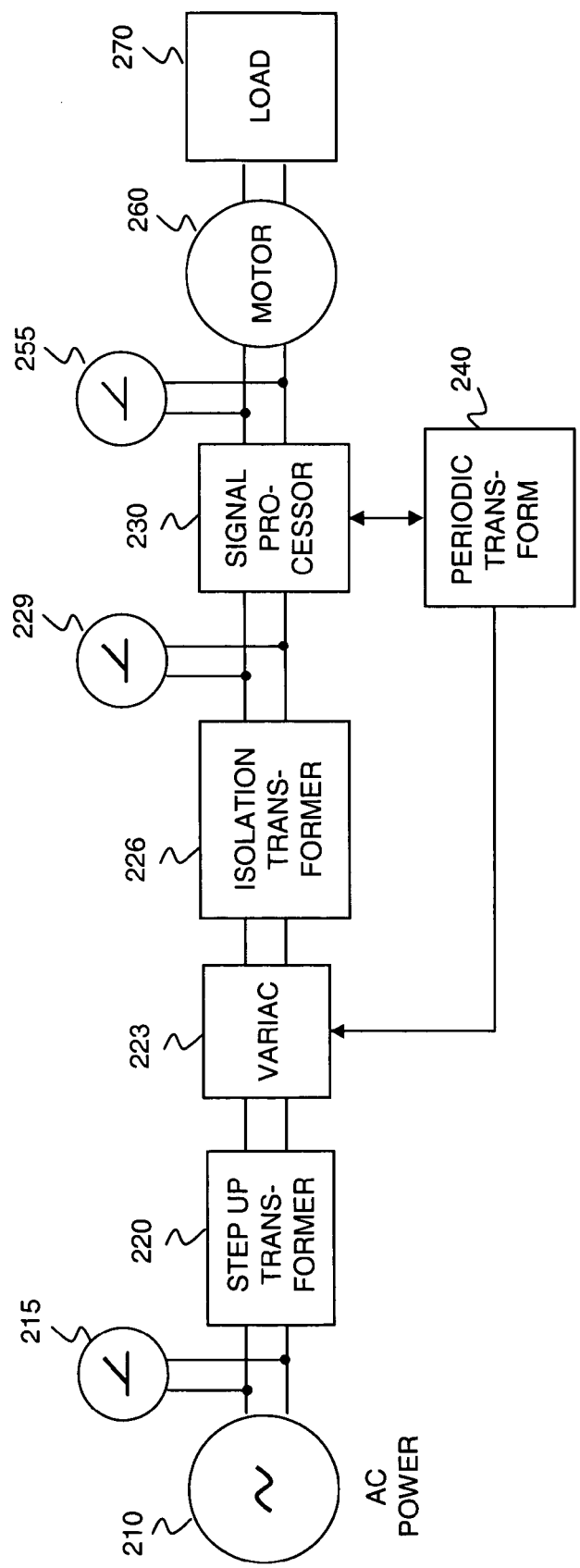
FIG. 2B is a more detailed version of FIG. 1, showing in a little more detail one embodiment of a variable transformer which may be used in accordance with the invention.

In FIG. 2B, a more detailed version of the variable isolation transformer 120 from FIG. 1 is provided, in the form of step up transformer 220, variable AC transformer 223 (also known as a variac), and isolation transformer 226. Meters 215 and 229 are provided at spots corresponding to those in FIG. 2A. In FIG. 2B, signal processor block 230 is provided between isolation transformer 226 and motor 260. A further meter 255 is provided to show the output of signal processor 230 going to motor 260.

As in the configuration of FIG. 1, here a reactance table, such as Table 1, in the periodic transform block 140 (FIG. 1) or 240 (FIG. 2B) provides contrasting associations between capacitance and inductance using corresponding values which reduce signal to noise ratios, thus providing a more harmonic relationship between the positive (inductance-related) and negative (capacitance-related) characteristics of the power source. In the interchange between periodic transform block 240 and signal processing block 230, the system can measure the characteristics of the circuit both before and after the imposition of the reactance table according to the periodic transform (in one embodiment, Tru-Scale), and can adjust the variac to provide optimum input to the overall circuit. More specifically, once the computed values of the capacitive and inductive relationships have been applied to the circuit, the power source (in this embodiment, a variac) can be increased or decreased, to provide greater or lesser torque depending upon the requirements of a work load. As a result, the same workload can be utilized with less power because of harmonic power relationships, or more torque can be provided for the same amount of power.

It also should be noted that the power source is not critical to the invention. The source could be an AC wall outlet, or in larger applications, a commercial or other power grid, providing power from either a commercial electrical source, or wind-based, sun-based, nuclear-based, mechanically-based, fossil fuel-based, geothermally-based, hydrodynamically-based, or any other type of power source. What the invention does is to reduce distortion in input electrical energy in order to enable more efficient driving of electrical equipment (a load). Whether the invention is placed at the input to a motor, between an electrical power source and the motor, or at the output of a generator, between the generator and a load, makes no difference.

Table 2 shows the results of a test conducted using the configuration of FIG. 2A, where the load was a water pump. The test was conducted for one hour, and for an input from the AC power grid of 7.4 amps, 120.8 volts, 893.92 watts were generated (632 watts RMS). This is also the measured output at meter 229 after the output of step up transformer 220. The pump (load 270) was able to pump 3.0 gallons per minute, or 180 gallons of water in a one hour test, at a pressure of 5.5 psi.

TABLE 2

| Readings at 215 | Readings at 229 | Performance (one hour) |
| --- | --- | --- |
| 7.4 amps | 7.4 amps | 3.0 gal per min |
| 120.8 volts | 120.8 volts | 180 gals |
| 893.92 watts | 893.92 watts | 5.5 PSI |
| 632.00 watts RMS | 632.00 watts RMS | |

Table 3 below shows results according to the invention using the configuration of FIG. 2B. At meter 215, power coming off the grid was shown to be 7.5 amps, 120.6 volts coming out of a wall outlet, for total power generation of 904.5 watts. Coming out of isolation transformer 229, there were 28.2 amps, 194 volts, and total power output of 5,470.8 watts (3867.85 watts RMS). This power output increase was achieved in accordance with the invention, in which periodic transformation from block 240 was applied to variac 223. At the output of signal processor block 230, meter 255 read the same results as at meter 229. The performance of the system resulted in 6.2 gallons per minute being pumped, for 186 gallons in a 30 minute test, at a pressure of 8.1 psi.

TABLE 3

| Readings at 215 | Readings at 229 | Readings at 255 | Performance (30 mins) |
| --- | --- | --- | --- |
| 7.5 A | 28.2 A | 28.2 A | 6.2 gal per min |
| 120.6 V | 194 V | 194 V | 186 gal |

TABLE 3-continued

| Readings at 215 | Readings at 229 | Readings at 255 | Performance (30 mins) |
|---|---|---|---|
| 904.5 W | 5470.8 W | 5470.8 W | 8.1 PSI |
| 639.48 W RMS | 3867.85 W RMS | 3867.85 W RMS | |

In Table 4, the readings at meter 215 showed current of 7.5 amps, 54.5 volts, and 408.75 watts total output. The output at meter 229 was 15.6 amps, 160.0-volts, and 2496 watts. The output at meter 255 was 25.6 amps, 160.0 volts, and 2496 watts. Table 4 shows the results of tests employing this configuration. The results show significant output enhancement, even with reduced requirements off the power grid.

TABLE 4

| Readings at 215 | Readings at 229 | Readings at 255 | Performance (one hour) |
|---|---|---|---|
| 7.5 A | 15.6 A | 15.6 A | 2.5 gal per min |
| 54.5 V | 160.0 V | 160.0 V | 150 gallons |
| 408.75 W | 2496 W | 2496 W | 5.5 PSI |
| 288.98 W RMS | 1764.67 W RMS | 1764.67 W RMS | |

Figure 3:
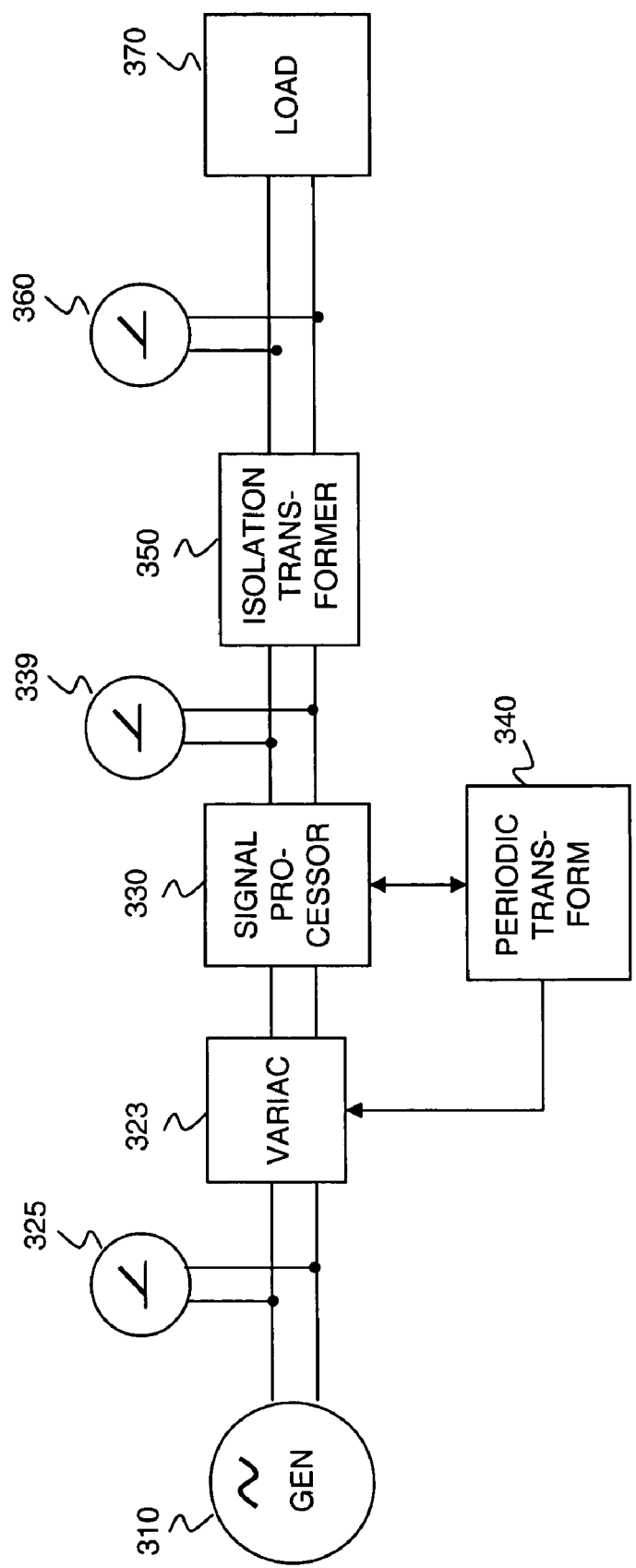
FIG. 3 is a block diagram of yet another test configuration employing the signal processing techniques of the present invention.

In another set of tests, the configuration shown in FIG. 3 was provided, wherein the load was a pair of two 1,000 volt lamps. In order to power the lamps using this configuration, a generator 310 provides output to power a configuration similar to that of FIG. 2B, to drive a load 370 (the two 1,000 watt lamps). Table 5 shows the results of tests employing this configuration.

In Table 5, the readings at meter 325 at the output of generator 310 showed current of 7.5 amps, 120 volts, and 900 watts total output (636.3 watts RMS). At meter 339 at the output of signal processor 330, meter 329 shows readings of 19.1 amps, 111 volts, and 2,120.1 watts (1498.90 watts RMS). The output at meter 360 after isolation transformer 350 was 18.6 amps, 101 volts, and 1,878.6 watts (1328,17 watts RMS).

TABLE 5

| Readings at 325 | Readings at 339 | Readings at 360 | Performance |
|---|---|---|---|
| 7.5 A | 19.1 A | 18.6 A | |
| 120 V | 111 V | 101 V | 2 × 1000 W lamps |
| 900.0 W | 2120.1 W | 1878.6 W | |
| 636.3 W RMS | 1498.90 W RMS | 1328.17 W RMS | |

The signal processing accomplished in blocks 140, 240, and 340 employs exemplary inductive and capacitive reactance tables as shown above, using the periodic transformations in accordance with the invention, according to one embodiment. Any of the transforms disclosed in the above-referenced commonly-assigned patents may be used.

Figure 4:
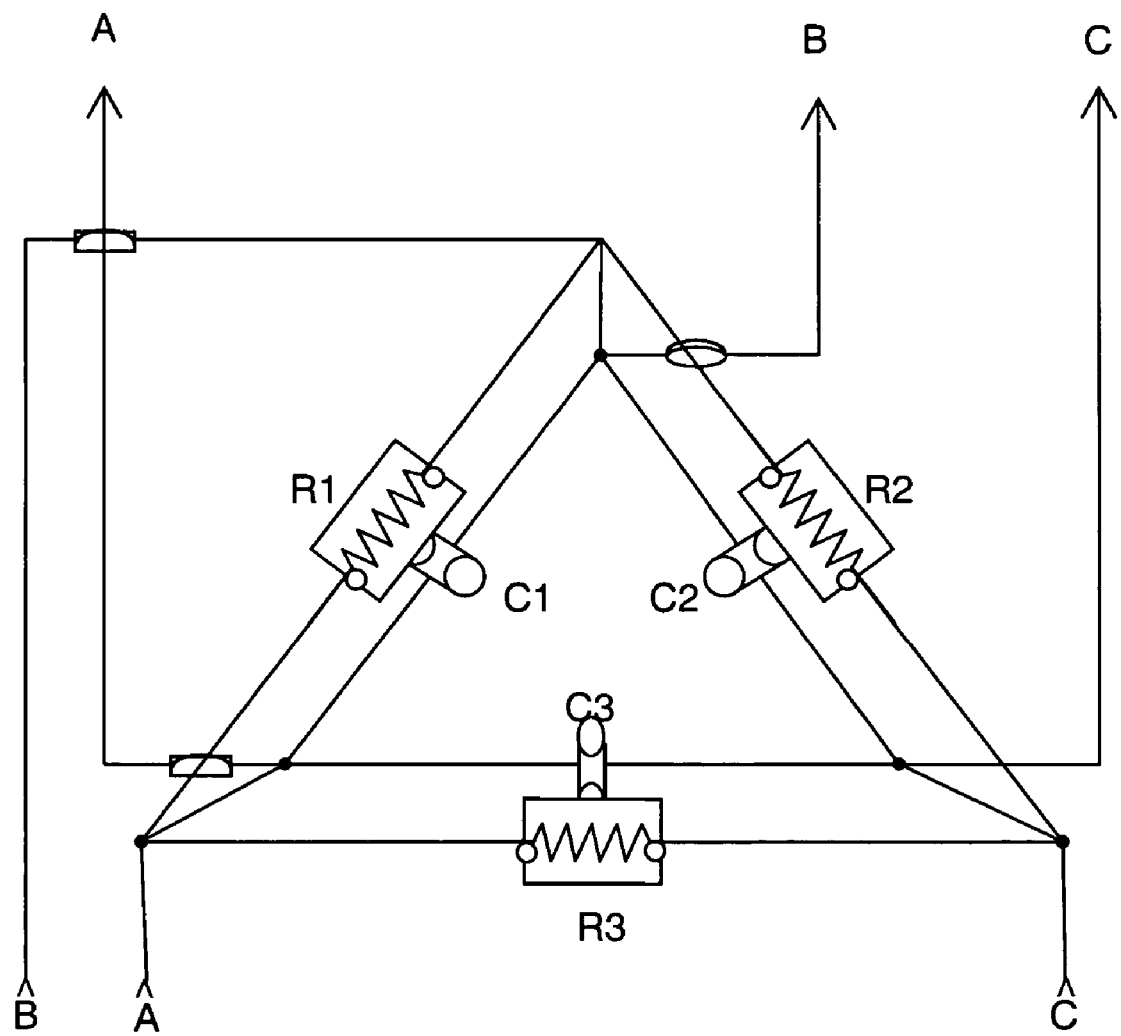
FIG. 4 shows a circuit implementation of the invention for a three-phase motor.
Figure 4:
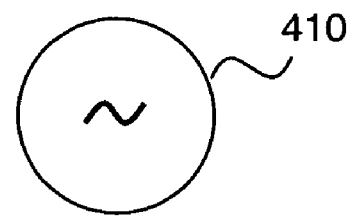

In FIG. 4, showing a three-phase implementation of the invention for a three-phase motor 410 (which may be substituted for the motor 260 in FIG. 2A), the input wire for phase A is attached to the left terminal of a first capacitor C1, and another connection is made from a right terminal of capacitor C1 to a left terminal of capacitor C2. The input wire for phase B is attached to the left terminal of capacitor C2, and the other terminal of capacitor C2 is connected to a left terminal of capacitor C3. The input wire of phase C is attached to the left terminal of capacitor C3, and the other terminal of capacitor C3 is connected to the left terminal of capacitor C1.

An output wire for phase A is connected from the left terminal of capacitor C1 to the phase A input of the motor. The output wire for phase B is connected from the left terminal of capacitor C2 to the phase B input of the motor. The output wire for phase C is connected from the left terminal of capacitor C3 to the phase C input of the motor.

Test results using a motor configured as in FIG. 4 are as follows:

TABLE 6

| Readings at 410 | Readings at 410 | Work Performance |
|---|---|---|
| Baseline | Three Phase Implementation | 20.5 psi |
| 462 V | 462 V | |
| 1.7 A | 1.6 A | |
| 552 W RMS @ watt meter | 185 W RMS @ watt meter | 20.5 psi |
| 552 W per hour | 185 W per hour | |

While the invention has been described in detail above with reference to preferred embodiments, various modifications within the scope and spirit of the invention will be apparent to ordinarily skilled artisans. As a result, the invention should be construed as limited only by the scope of the following claims.

What is claimed is:

1. A signal processing system comprising:
   a. processing circuitry receiving input signals corresponding to power signals; and
   b. periodic transformation circuitry communicating with said processing circuitry to communicate inductive capacitance and/or capacitive reactance values based on a predetermined periodic transformation system, so as to reduce distortion in the power signals;
   c. said periodic transformation circuitry providing an output which can be used to control power draw requirements from a power source.

2. A system as claimed in claim 1, wherein the periodic transformation system comprises a TruScale Reactance Transformation System which includes the following table:

| Capacitive Reactance | Interval | Inductive Reactance | Interval |
|---|---|---|---|
| 1.171875 | | 1.171875 | |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.0488281250 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |

-continued

| Capacitive Reactance | Interval | Inductive Reactance | Interval |
|---|---|---|---|
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 | | 2.34375. | |

3. A system as claimed in claim 1, wherein said processing circuitry calculates resistance within an incoming DC signal, and uses said predetermined periodic transformation system to process said DC signal to reduce resistance therein.

4. A system as claimed in claim 1, wherein said processing circuitry calculates resistance/impedance in an input AC signal, and uses said predetermined periodic transformation system to process said AC signal to reduce resistance/impedance therein.

5. A system as claimed in claim 1, wherein said processing circuitry performs phase coherence in accordance with said periodic transformation system.

6. In a motor for converting electrical energy into another form of energy, the improvement comprising
the system according to claim 1, receiving either DC or AC power from a power source and compensating for phase differences in current and voltage signals therein.

7. A motor as claimed in claim 6, wherein said motor is a three-phase AC motor.

8. A motor as claimed in claim 6, wherein the periodic transformation system comprises a TruScale Reactance Transformation System which includes the following table:

| Capacitive Reactance | Interval | Inductive Reactance | Interval |
|---|---|---|---|
| 1.171875 | | 1.171875 | |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.0488281250 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 | | 2.34375. | |

9. A motor as claimed in claim 6, wherein said processing circuitry calculates resistance within an incoming DC signal, and uses said predetermined periodic transformation system to process said DC signal to reduce resistance therein.

10. A motor as claimed in claim 6, wherein said processing circuitry calculates resistance/impedance in an input AC signal, and uses said predetermined periodic transformation system to process said AC signal to reduce resistance/impedance therein.

11. A motor as claimed in claim 6, wherein said processing circuitry performs phase coherence in accordance with said periodic transformation system.

12. A motor according to claim 6, wherein the power signals come from a power source selected from one or more of the group consisting of electrical, wind, hydrodynamic, gas-powered, nuclear, and mechanical.

13. In a generator for producing electrical energy from another form of energy, the improvement comprising:
   a. a power source selected from one or more of the group consisting of wind, hydrodynamic, fossil fuel, nuclear, geothermal, and mechanical, and producing an electrical output; and
   b. the system according to claim 1, receiving either DC or AC power from said power source and compensating for phase differences in current and voltage signals therein.

14. A generator as claimed in claim 13, wherein the periodic transformation system comprises a TruScale Reactance Transformation System which includes the following table:

| Capacitive Reactance | Interval | Inductive Reactance | Interval |
|---|---|---|---|
| 1.171875 | | 1.171875 | |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.0488281250 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 | | 2.34375. | |

15. A generator as claimed in claim 13, wherein said processing circuitry calculates resistance within an incoming DC signal, and uses said predetermined periodic transformation system to process said DC signal to reduce resistance therein.

16. A generator as claimed in claim 13, wherein said processing circuitry calculates resistance/impedance in an input AC signal, and uses said predetermined periodic transformation system to process said AC signal to reduce resistance/impedance therein.

17. A generator as claimed in claim 13, wherein said processing circuitry performs phase coherence in accordance with said periodic transformation system.

18. In a motor for converting electrical energy into another form of energy, the improvement comprising
  a. the system according to claim 1, receiving either DC or AC power from a power source and compensating for phase differences in current and voltage signals therein;
  b. wherein the system of claim 1 receives information relating to a resonant state of said motor and provides an output so as to make said resonant state persistent in said motor.

19. A motor according to claim 18, wherein said resonance is series resonance.

20. A motor according to claim 19, wherein said motor is a DC motor.

21. A motor according to claim 19, wherein said motor is an AC motor.

22. A motor according to claim 18, wherein said resonance is parallel resonance.

23. A motor according to claim 22, wherein said motor is a DC motor.

24. A motor according to claim 22, wherein said motor is an AC motor.

25. A motor as claimed in claim 24, wherein said AC motor is a three-phase AC motor.

26. A motor as claimed in claim 18, wherein the periodic transformation system comprises a TruScale Reactance Transformation System which includes the following table:

| Capacitive Reactance | Interval | Inductive Reactance | Interval |
|---|---|---|---|
| 1.171875 |  | 1.171875 |  |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.048828125 0 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 |  | 2.34375. |  |

27. A motor as claimed in claim 18, wherein said processing circuitry calculates resistance within an incoming DC signal, and uses said predetermined periodic transformation system to process said DC signal to reduce resistance therein.

28. A motor as claimed in claim 18, wherein said processing circuitry calculates resistance/impedance in an input AC signal, and uses said predetermined periodic transformation system to process said AC signal to reduce resistance/impedance therein.

29. A motor as claimed in claim 18, wherein said processing circuitry performs phase coherence in accordance with said periodic transformation system.

30. A motor according to claim 18, wherein the power signals come from a power source selected from one or more of the group consisting of electrical, wind, hydrodynamic, gas-powered, nuclear, and mechanical.

31. In a generator for producing electrical energy from another form of energy, the improvement comprising;
  the system according to claim 1, receiving either DC or AC power from a power source selected from one or more of the group consisting of wind, hydrodynamic, fossil fuel, nuclear, geothermal, and mechanical, and compensating for phase differences in current and voltage signals therein;
  b. wherein the system of claim 1 receives information relating to a resonant state of said generator and provides an output so as to make said resonant state persistent in said generator.

32. A generator as claimed in claim 31, wherein said resonant state is a series resonant state.

33. A generator as claimed in claim 31, wherein said resonant state is a parallel resonant state.

34. A generator as claimed in claim 31, wherein sad the periodic transformation system comprises a TruScale Reactance Transformation System which includes the following table:

| Capacitive Reactance | Interval | Inductive Reactance | Interval |
|---|---|---|---|
| 1.171875 |  | 1.171875 |  |
| 1.21875 | 0.046875 | 1.220703125 | 0.048828125 |
| 1.265625 | 0.046875 | 1.26953125 | 0.048828125 |
| 1.3125 | 0.046875 | 1.318359375 | 0.048828125 |
| 1.359375 | 0.046875 | 1.3671875 | 0.048828125 |
| 1.40625 | 0.046875 | 1.416015625 | 0.048828125 |
| 1.453125 | 0.046875 | 1.46484375 | 0.048828125 |
| 1.5 | 0.046875 | 1.513671875 | 0.048828125 |
| 1.546875 | 0.046875 | 1.5625 | 0.048828125 |
| 1.59375 | 0.046875 | 1.611328125 | 0.048828125 |
| 1.640625 | 0.046875 | 1.66015625 | 0.048828125 |
| 1.6875 | 0.046875 | 1.708984375 | 0.048828125 |
| 1.734375 | 0.046875 | 1.7578125 | 0.048828125 0 |
| 1.78125 | 0.046875 | 1.7578125 | 0.048828125 |
| 1.828125 | 0.046875 | 1.806640625 | 0.048828125 |
| 1.875 | 0.046875 | 1.85546875 | 0.048828125 |
| 1.921875 | 0.046875 | 1.904296875 | 0.048828125 |
| 1.96875 | 0.046875 | 1.953125 | 0.048828125 |
| 2.015625 | 0.046875 | 2.001953125 | 0.048828125 |
| 2.0625 | 0.046875 | 2.05078125 | 0.048828125 |
| 2.109375 | 0.046875 | 2.099609375 | 0.048828125 |
| 2.15625 | 0.046875 | 2.1484375 | 0.048828125 |
| 2.203125 | 0.046875 | 2.197265625 | 0.048828125 |
| 2.25 | 0.046875 | 2.24609375 | 0.048828125 |
| 2.296875 | 0.046875 | 2.294921875 | 0.048828125 |
| 2.34375 |  | 2.34375. |  |

35. A generator as claimed in claim 31, wherein said processing circuitry calculates resistance within an incoming DC signal, and uses said predetermined periodic transformation system to process said DC signal to reduce resistance therein.

36. A generator as claimed in claim 31, wherein said processing circuitry calculates resistance/impedance in an input AC signal, and uses said predetermined periodic transformation system to process said AC signal to reduce resistance/impedance therein.

37. A generator as claimed in claim 31, wherein said processing circuitry performs phase coherence in accordance with said periodic transformation system.

* * * * *